(12) United States Patent
Charalambides et al.

(10) Patent No.: US 10,749,952 B2
(45) Date of Patent: Aug. 18, 2020

(54) NETWORK BASED OPERATION OF AN UNMANNED AERIAL VEHICLE BASED ON USER COMMANDS AND VIRTUAL FLIGHT ASSISTANCE CONSTRAINTS

(71) Applicant: Cape mcuAS, Inc., Chicago, IL (US)

(72) Inventors: Gabriel Charalambides, Redwood City, CA (US); John David Stockford, Redwood City, CA (US); Alexandre El Assad, Palo Alto, CA (US); Richard Stephen Pasetto, Mountain View, CA (US); Naoki Hiroshima, Palo Alto, CA (US); Venkata Karthik Thota, Dublin, CA (US)

(73) Assignee: CAPE MCUAS, INC., Chicago, IL (US)

(*) Notice: Subject to any disclaimer, the term of this patent is extended or adjusted under 35 U.S.C. 154(b) by 158 days.

(21) Appl. No.: 16/173,941

(22) Filed: Oct. 29, 2018

(65) Prior Publication Data

US 2019/0072949 A1 Mar. 7, 2019

Related U.S. Application Data

(63) Continuation-in-part of application No. 15/611,644, filed on Jun. 1, 2017, now Pat. No. 10,382,539.

(Continued)

(51) Int. Cl.
*H04L 29/08* (2006.01)
*H04L 29/06* (2006.01)

(Continued)

(52) U.S. Cl.
CPC .......... *H04L 67/1091* (2013.01); *B64C 39/00* (2013.01); *B64C 39/024* (2013.01);

(Continued)

(58) Field of Classification Search
CPC ............. H04L 67/1091; H04L 65/4069; H04L 65/608; H04L 67/1085; H04L 67/1093; H04L 67/146; H04L 67/42; H04W 4/70; H04W 4/021; H04N 5/23299; B64C 39/00; B64C 39/024; G05D 1/0016; G05D 1/0022; G05D 1/0038; G05D 1/0094; G05D 1/101; G08G 5/0013; G08G 5/006;

(Continued)

(56) References Cited

U.S. PATENT DOCUMENTS 7,228,232 B2 6/2007 Bodin et al.
8,315,794 B1 11/2012 Strelow et al.

(Continued)

*Primary Examiner* — Hussein Elchanti

(57) ABSTRACT

Embodiment includes of a method and a system of network based operation of an unmanned aerial vehicle is disclosed. One system includes a drone user machine, a drone control machine, and a drone control console. The drone control machine is interfaced with the drone user machine through a network. The drone control machine is interfaced with a drone through the drone control console. The drone control machine operates to receive user commands from the drone user machine through the network, and generate drone control commands which are provided to the drone control console for controlling the drone, wherein the drone control commands are generated based on the user commands, and based on virtual flight assistance constraints.

17 Claims, 14 Drawing Sheets

Related U.S. Application Data

(60) Provisional application No. 62/399,951, filed on Sep. 26, 2016, provisional application No. 62/344,276, filed on Jun. 1, 2016.

(51) Int. Cl.

| | |
|---|---|
| *G05D 1/00* | (2006.01) |
| *B64C 39/02* | (2006.01) |
| *G08G 5/00* | (2006.01) |
| *G05D 1/10* | (2006.01) |
| *H04N 5/232* | (2006.01) |
| *B64C 39/00* | (2006.01) |
| *G08G 5/04* | (2006.01) |
| *H04W 4/70* | (2018.01) |
| *H04W 4/021* | (2018.01) |
| *H04W 4/02* | (2018.01) |
| *H04W 4/40* | (2018.01) |

(52) U.S. Cl.
CPC ......... *G05D 1/0016* (2013.01); *G05D 1/0022* (2013.01); *G05D 1/0038* (2013.01); *G05D 1/0094* (2013.01); *G05D 1/101* (2013.01); *G08G 5/006* (2013.01); *G08G 5/0013* (2013.01); *G08G 5/0069* (2013.01); *G08G 5/0078* (2013.01); *G08G 5/0086* (2013.01); *G08G 5/045* (2013.01); *H04L 65/4069* (2013.01); *H04L 65/608* (2013.01); *H04L 67/1085* (2013.01); *H04L 67/1093* (2013.01); *H04L 67/146* (2013.01); *H04L 67/42* (2013.01); *H04N 5/23299* (2018.08); *H04W 4/021* (2013.01); *H04W 4/70* (2018.02); *B64C 2201/141* (2013.01); *B64C 2201/146* (2013.01); *H04L 67/14* (2013.01); *H04W 4/023* (2013.01); *H04W 4/027* (2013.01); *H04W 4/40* (2018.02)

(58) Field of Classification Search
CPC .. G08G 5/0069; G08G 5/0078; G08G 5/0086; G08G 5/045
See application file for complete search history.

(56) References Cited

U.S. PATENT DOCUMENTS

| | | | |
|---|---|---|---|
| 9,410,783 B1 | 8/2016 | Khuc et al. | |
| 9,508,263 B1* | 11/2016 | Teng | B64C 39/024 |
| 9,540,121 B2 | 1/2017 | Byers et al. | |
| 9,563,201 B1 | 2/2017 | Tofte et al. | |
| 9,613,539 B1 | 4/2017 | Lindskog et al. | |
| 9,654,476 B2 | 5/2017 | Lemmey et al. | |
| 9,678,506 B2 | 6/2017 | Bachrach et al. | |
| 9,692,705 B1 | 6/2017 | Zhou et al. | |
| 9,891,621 B2 | 2/2018 | Bachrach et al. | |
| 9,928,748 B2 | 3/2018 | Chan et al. | |
| 10,083,615 B2 | 9/2018 | Chan et al. | |
| 2009/0027253 A1* | 1/2009 | van Tooren | G08G 5/045 |
| | | | 342/29 |
| 2010/0042269 A1* | 2/2010 | Kokkeby | G01S 3/7864 |
| | | | 701/3 |
| 2014/0018979 A1* | 1/2014 | Goossen | G05D 1/0044 |
| | | | 701/3 |
| 2015/0370250 A1 | 12/2015 | Bachrach et al. | |
| 2016/0107749 A1 | 4/2016 | Mucci | |
| 2016/0194079 A1 | 7/2016 | Montreuil | |
| 2017/0110014 A1* | 4/2017 | Teng | G08G 5/0086 |
| 2017/0192418 A1* | 7/2017 | Bethke | G08G 5/0013 |
| 2017/0334559 A1* | 11/2017 | Bouffard | G08G 5/0082 |
| 2018/0003656 A1* | 1/2018 | Michini | H02S 50/10 |
| 2018/0025649 A1* | 1/2018 | Contreras | G01C 21/00 |
| | | | 701/3 |
| 2018/0068567 A1* | 3/2018 | Gong | G08G 5/0052 |
| 2018/0329413 A1 | 11/2018 | Charalambides et al. | |
| 2018/0342329 A1 | 11/2018 | Rufo et al. | |
| 2019/0109900 A1 | 4/2019 | Charalambides et al. | |

* cited by examiner

Interfacing, through a network, a drone user machine with a drone control machine

1410

Interfacing, through a drone control console, the drone control machine with the drone

1420

Receiving, by the drone control machine, user commands from the drone user machine through the network

1430

Generating, by the drone control machine, drone control commands which are provided to the drone control console for controlling the drone, wherein the drone control commands are generated based on the user commands, and based on a three dimensional geographical fence

1440

Figure 14

NETWORK BASED OPERATION OF AN UNMANNED AERIAL VEHICLE BASED ON USER COMMANDS AND VIRTUAL FLIGHT ASSISTANCE CONSTRAINTS

CROSS-REFERENCE TO RELATED APPLICATIONS

This application is a continuation-in-part (CIP) of U.S. patent application Ser. No. 15/611,644, filed Jun. 1, 2017, which claims priority to U.S. Provisional Patent Application Ser. No. 62/344,276, filed Jun. 1, 2016 and U.S. Provisional Patent Application Ser. No. 62/399,951, filed Sep. 26, 2016, the contents of each referenced provisional patent application are incorporated herein by reference.

FIELD OF THE INVENTION

This application relates generally to the control of unmanned aerial vehicles, commonly referred to as drones. More particularly, this invention is directed toward a network based operation of an unmanned aerial vehicle based on user commands and virtual flight assistance constraints.

BACKGROUND OF THE INVENTION

The military relies upon proprietary, secure, high-speed networks for remote manipulation of a drone. Commercially available drones continue to drop in price. There is a growing desire to find safe and cost effective deployments of such drones. It would be desirable to remotely manipulate a commercially available drone without the need for the elaborate infrastructure deployed by the military.

SUMMARY OF THE INVENTION

One embodiment includes a method of remote location control of flight of a drone. The method includes interfacing, through a network, a drone user machine with a drone control machine, interfacing, through a drone control console, the drone control machine with the drone, receiving, by the drone control machine, user commands from the drone user machine through the network, and generating, by the drone control machine, drone control commands which are provided to the drone control console for controlling the drone, wherein the drone control commands are generated based on the user commands, and based on virtual flight assistance constraints.

Another embodiment includes a system. The system includes a drone user machine, a drone control machine, and a drone control console. The drone control machine is interfaced with the drone user machine through a network. The drone control machine is interfaced with a drone through the drone control console. The drone control machine operates to receive user commands from the drone user machine through the network, and generate drone control commands which are provided to the drone control console for controlling the drone, wherein the drone control commands are generated based on the user commands, and based on virtual flight assistance constraints.

BRIEF DESCRIPTION OF THE FIGURES

The invention is more fully appreciated in connection with the following detailed description taken in conjunction with the accompanying drawings, in which:

FIG. 14 is a flow chart that includes steps of a method of remote location control of flight of a drone, according to an embodiment.

Like reference numerals refer to corresponding parts throughout the several views of the drawings.

DETAILED DESCRIPTION OF THE INVENTION

Figure 1:
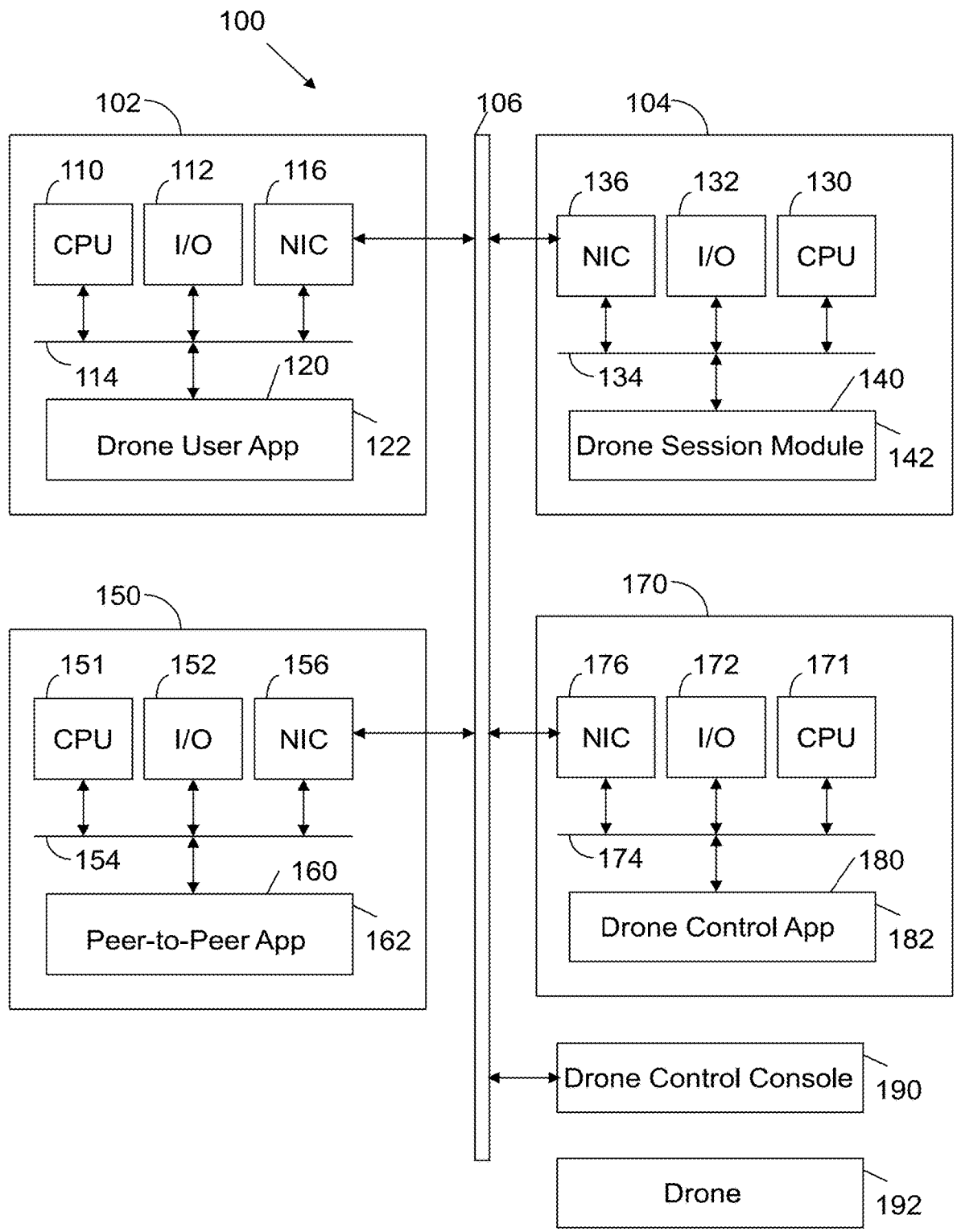
FIG. 1 illustrates a system configured in accordance with an embodiment of the invention.

FIG. 1 illustrates a system 100 configured in accordance with an embodiment of the invention. The system 100 includes a drone user machine 102 connected to a drone session server 104 via a network 106, which may be any combination of wired and wireless networks. The drone user machine 102 may be a desktop computer, laptop computer, tablet, mobile device, game console, wearable device and the like. The drone user machine has a processor, such as a central processing unit 110, connected to input/output devices 112 via a bus 114. The input/output devices 112 may include a keyboard, mouse, touch display and the like. A network interface circuit (NIC) 116 is also connected to the bus 114 to provide connectivity to network 106. A memory 120 is also connected to the bus. The memory 120 stores instructions executed by the processor 110. In particular, the memory 120 stores a drone user application 122 to coordinate the remote piloting of a drone that is not in viewable range of the user of the drone user machine 102. As detailed below, the drone user machine 102 may be used to pilot a drone thousands of miles away. The drone user machine 102 receives video from the drone and supplies to the drone user commands. The user commands may be keyboard strokes, gestures to a touch display, game console inputs and the like. The user commands may relate to x-axis, y-axis, z-axis, roll, pitch and yaw instructions for the drone. In addition, the user commands may include positional commands for a gimbal holding a video camera.

The drone session server 104 includes standard components, such as a processor 130, input/output devices 132, a bus 134 and a network interface circuit 136 to provide connectivity to network 106. A memory 140 is connected to the bus. The memory 140 stores instructions executed by the processor 130 to implement operations disclosed herein. In one embodiment, the memory 140 stores a drone session module 142. The drone session module 140 records information about a drone session. For example, the drone session module 140 may include executable instructions to assign a session number, collect a session connection time, a session take-off time, a user control time, and an autopilot resume time. The drone session module 140 may also include executable instructions to evaluate a drone session. For example, parameters related to the drone session may be compared against normative parameters for a drone session (e.g., avoid geographical fence, avoid stationary obstacles, avoid airborne obstacles, etc.). The drone session module 142 may collect such data and provide drone session analytics.

System 100 also includes a peer server 150. The peer server 150 includes components, such as a processor 151, input/output devices 152, a bus 154 and a network interface circuit 156. A memory 160 is connected to the bus 154. The memory 160 stores a peer-to-peer application 162 with instructions executed by processor 151. The peer-to-peer application 162 supports peer-to-peer (P2P) computing, which is a distributed application architecture that partitions tasks or workloads between peers. Each peer makes a portion of its resources, such as processing power, disk storage or network bandwidth, directly available to other network participants without the need for central coordination by a server. Peers are both suppliers and consumers of resources, in contrast to the traditional client-server model in which the consumption and supply of resources is divided. The peer machine 150 initializes a peer-to-peer connection between the drone user machine 102 and the drone control machine 170. Once the peer-to-peer connection is established, drone user machine 102 and drone control machine 170 communicate directly utilizing network 106.

The drone control machine 170 includes a processor 171, input/output devices 172, a bus 174 and a network interface circuit 176. A memory 180 is connected to the bus 174. The memory stores a drone control application 182 with instructions executed by the processor 171. The drone control application 182 sends drone operation instructions to a drone control console 190, which interacts with a drone 192. For example, the drone control application 170 may be executed on a tablet that is in wireless communication with a WiFi hub. The drone control machine 170 may have a hardwired (e.g., USB) connection to the drone control console 190. The drone control console 190 is typically used by a drone operator to fly a drone that is in the visual presence of the operator. In this instance, the operator is at the drone user machine 102, which is not in the visual presence of the drone.

Figure 2:
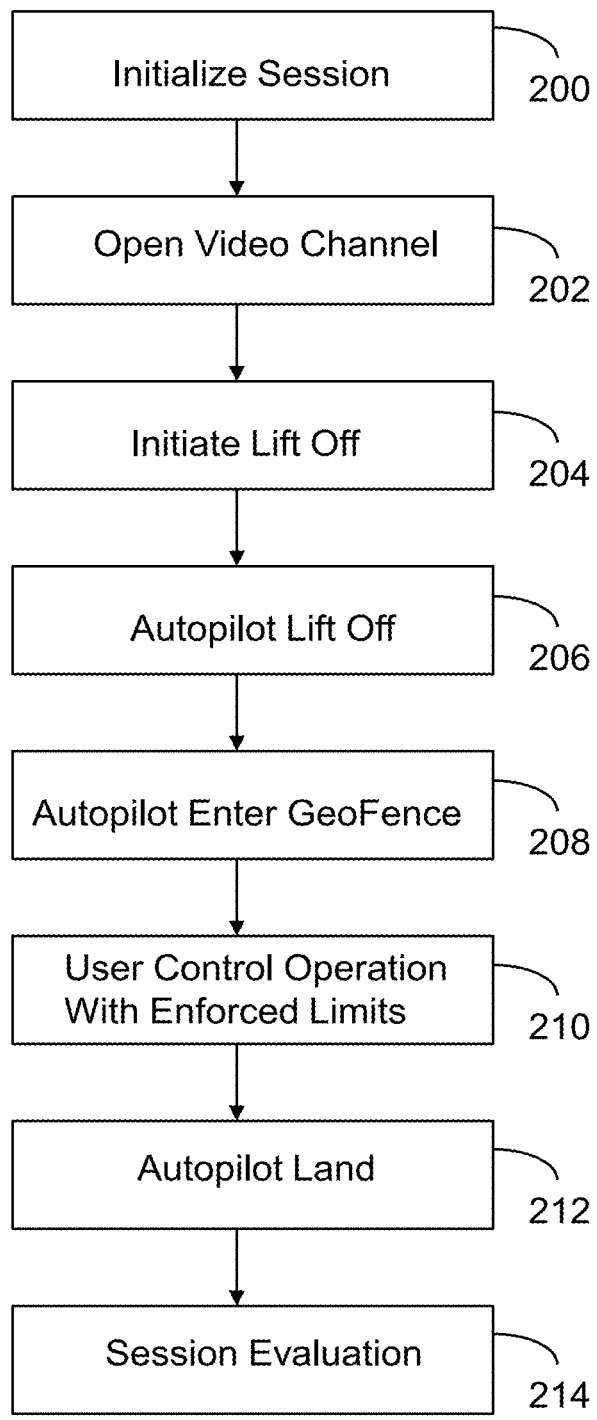
FIG. 2 illustrates simplified processing operations associated with an embodiment of the invention.

FIG. 2 illustrates processing operations associated with an embodiment of the invention. Initially, a session is initialized 200. This may entail a drone technician placing a drone on a launch pad and advising the drone session server 104 of the availability of the drone. That is, the drone control machine 170 sends a signal to the drone session server 104 indicating the availability of the drone.

A video channel is then opened 202. That is, a video camera on the drone is turned on. A video supply is fed via a peer-to-peer connection from the drone control machine 170 to the drone user machine 102. This process is discussed in detail below in connection with the discussion of FIGS. 3 and 4. This allows the drone user machine 102 to observe the drone video feed. The drone user machine 102 may then initiate lift off 204. That is, a signal is sent from the drone user machine 102, to the drone control machine 170 via the peer-to-peer connection to initiate lift off. This causes the drone control machine 170 to signal the drone control console 190, which deploys the lift off command to the drone 192. The drone control application 182 then coordinates an autopilot lift off 206 into a three-dimensional geographical fence (geofence) 208. FIG. 5 illustrates an example of a three-dimensional geofence 500.

Figure 6:
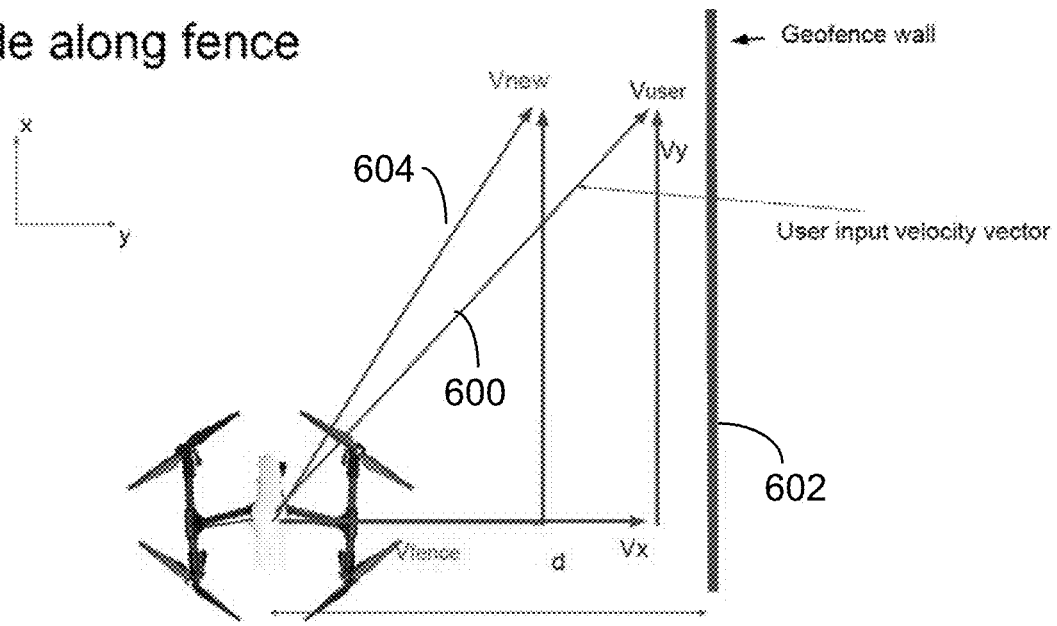
FIG. 6 illustrates user control with enforced limits in accordance with an embodiment of the invention.

Once inside the geofence, a user at the drone user machine 102 can control the operation of the drone with enforced limits 210. That is, the user at the drone user machine 102 sends commands to the drone control machine 170 via the peer-to-peer connection. The drone control application 182 enforces limits on the commands to ensure safe drone operation. For example, the limits may constrain the drone to remain within the geofence. For example, FIG. 6 illustrates a user command vector 600 that will rapidly engage a geofence wall 602. The drone control application 182 produces a revised vector 604 to prevent engagement with the geofence wall 602. The drone control application enforces similar limits with respect to stationary objects and airborne objects within the geofence, as discussed below. In response to a command from the drone user machine 102, a predetermined timeout or a low battery condition, autopilot is invoked to first fly the drone safely to its takeoff location and then to land the drone 212. Thereafter, the session is evaluated 214. That is, the drone session server 104 receives drone session parameters throughout the session. The drone session module 142 evaluates the drone session parameters to determine whether the drone session was a success. The drone session module 142 may maintain flight data for multiple sessions and thereby supply drone analytic data in response to requests from the drone user machine 102 or the drone control machine 170.

Figure 3:
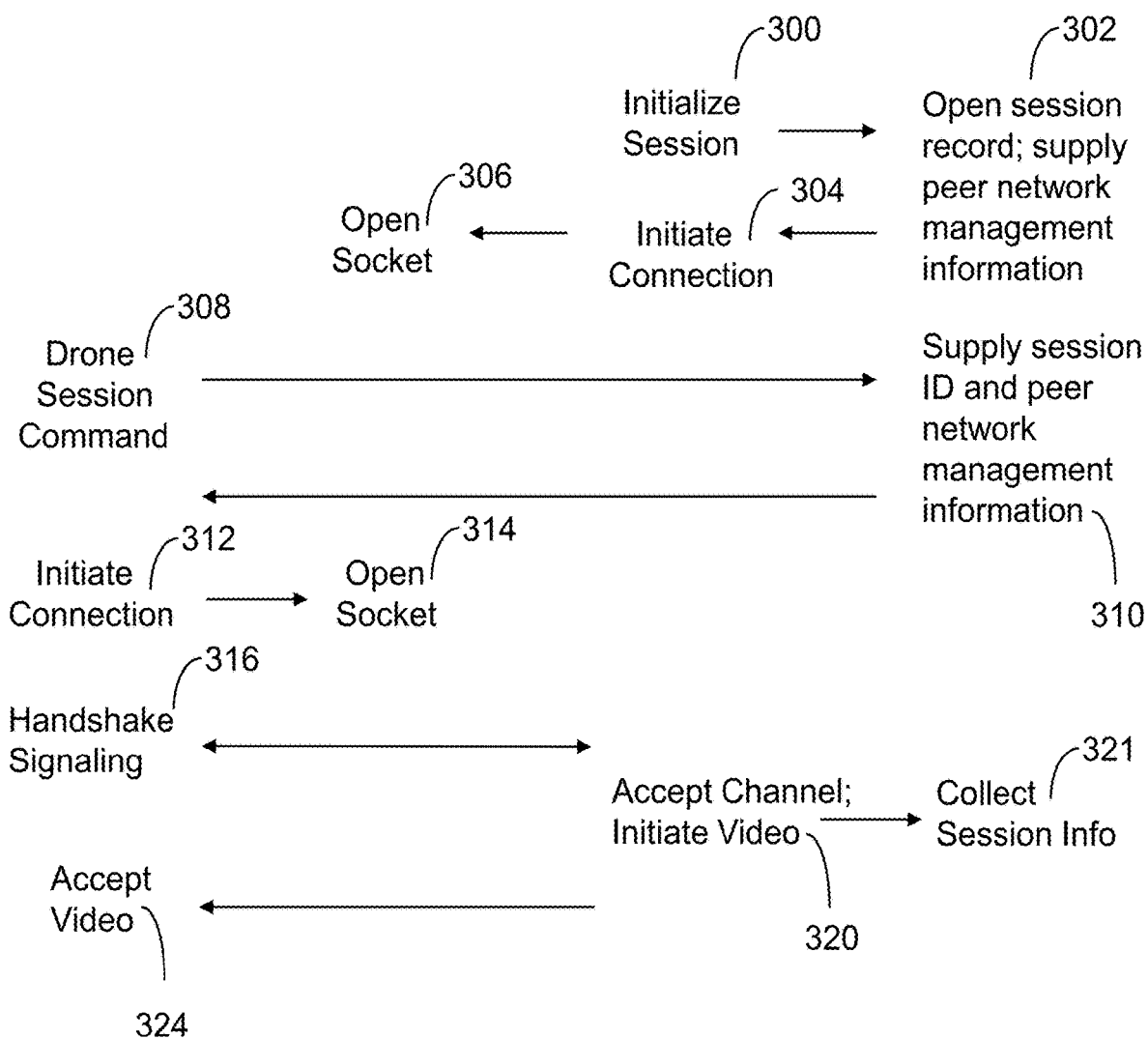
FIG. 3 illustrates distributed processing operations performed in accordance with an embodiment of the invention.
Figure 4:
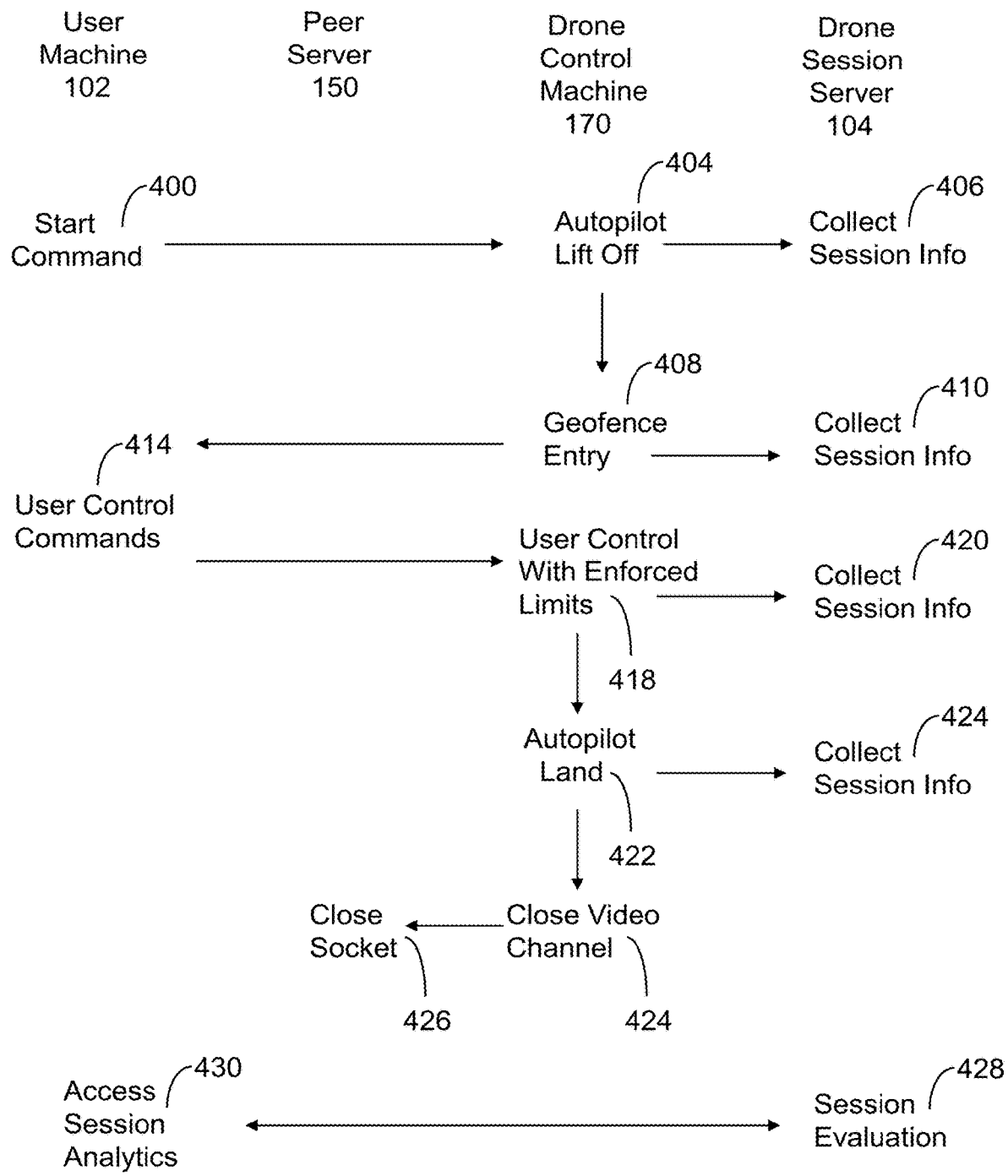
FIG. 4 illustrates distributed processing operations performed in accordance with an embodiment of the invention.
Figure 5:
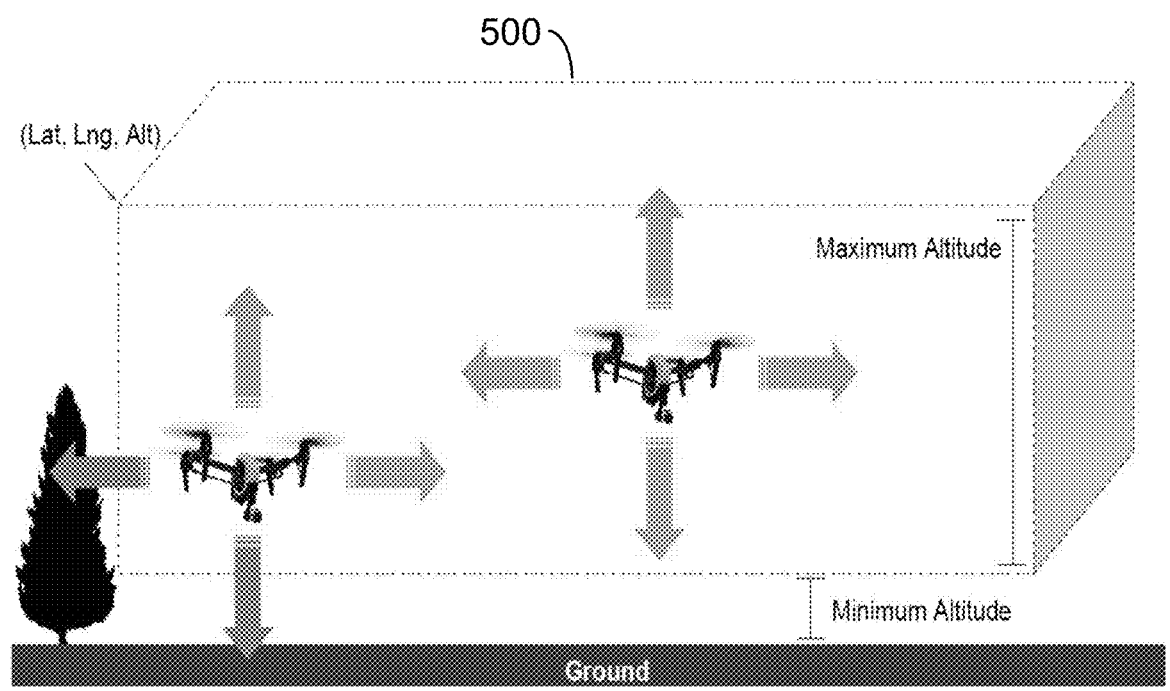
FIG. 5 illustrates a geographical fence utilized in accordance with an embodiment of the invention.

The operations of FIG. 2 are more fully characterized in FIGS. 3 and 4. FIG. 3 illustrates operations performed by the different machines in system 100. The drone control machine 170 initializes a session 300. For example, the drone control application 180 may include a menu with an option to create a new drone session. That menu selection may result in a call to drone session server 104 over network 106. In this context, the drone control machine 170 is operative as a client to drone session server 104. The call to the drone session server 104 may be an HTTP post command with parameters, such as session live=true and session_in_progress=false.

In response, the drone session server 104 opens a session record and supplies peer network management information 302. For example, the drone session module 140 may open a record for a new session and assign it a session identification. The peer network management information may include the session identification and peer information that allows for a peer-to-peer connection between two machines.

The drone control machine 170 then initiates a connection 304 by opening a web socket 306 on peer server 150. A web socket is a communications protocol that provides full-duplex communication channels over a single Transmission Control Protocol connection. Once the user machine 102 opens its own socket at the peer server 150 a peer-to-peer connection is established. The duplex operation includes a channel with drone control commands from the drone user machine 102 and a channel with video data from the drone control machine 170, which obtains the video data from the drone 192 via the drone console 190. The peer server 150 uses the session identification and peer network management information to enable the peer-to-peer connection. Once the peer-to-peer connection is established, the peer server 150 is not involved in the communications between the drone control machine 170 and the drone user machine 102.

The drone user machine 102 may now be used to issue a drone session command 308. For example, the drone user application 122 may include a menu that allows a user to select a new drone session. As a result, the drone user machine 102 sends a signal across network 106 to server 104. Observe here that the drone user machine 102 is operative as a client of drone session server 104. The drone session server 104 supplies a session identification and peer network management information 310 to the drone user machine 102. The session identification corresponds to the previously opened session record. The network management information includes connection information to facilitate a peer-to-peer connection between the drone user machine 102 and the drone control machine 170.

The drone user machine 102 uses this information to initiate a connection 312. In particular, the drone user machine 102 opens the web socket 314 and then initiates handshake signaling 316. For example, a WebRTC signaling handshake maybe used. Web Real-Time Communication (WebRTC) is a collection of communication protocols and application programming interfaces that enable real-time communication over peer-to-peer connections. WebRTC is used to facilitate video conferencing. In this context, WebRTC is used to facilitate a one-way video feed from the drone control application 182 to the drone user machine 102 via a peer-to-peer connection. The handshake signaling 316 is communicated to drone control machine 170. The drone control machine 170 accepts the channel and initiates video 320. The drone control machine 170 may also advise the drone session server 104 of this event. The drone session server 104 collects the session information 321.

The initiated video is then sent to the user machine 102, which accepts the video 324. At this point, the user at drone user machine 102 can view the flight area via the video feed.

Turning to FIG. 4, the user at the drone user machine 102 issues a start command 400. For example, the drone user application 122 may include a menu item to start the drone session. This command is communicated as a peer-to-peer communication to the drone control machine 170, which initiates an autopilot liftoff 404. This event may then be reported to the drone session server 104, which collects the session information 406. Observe here that the drone control machine 170 is simultaneously operative in a peer-to-peer communication with drone user machine 102 and as a client with the drone session server 104.

The autopilot operation results in the drone being directed into the geofence 408. This event is reported to the drone session server 104, which collects the session information 410. This event is also reported to the drone user machine 102 via a peer-to-peer communication. At this point, user control commands 414 may be issued by the user machine 102. The user control commands may be velocity, acceleration, and directional commands initiated at an input device at the user machine 102. The user control commands may also include drone gimbal movement and camera functions. The input device may be a console, a keyboard, mouse, touch display and the like. Each user command is communicated as a peer-to-peer communication with the drone control machine 170. The drone control machine 170 deploys the user command with enforced limits 418. Various session events may be reported to the drone session server 104, which collects the session information 420.

Eventually, the drone control machine 170 initiates an autopilot land operation 422. This event is reported to the drone session server 104, which collects the session information 424. The video channel is then closed 424 by sending a signal to the peer server 150 to close the socket 426.

The drone session server 104 may then evaluate the session 428. Session analytics may then be accessed 430 by the drone user machine 102 and/or the drone control machine 170.

The disclosed autopilot operations are based upon a pre-computed waypoint path within the geofence. The drone take-off location is often outside of the geofence. In such a case, a waypoint path which is outside of the geofence is computed to reach the geofence. The waypoint path is evaluated against the current position of the drone. At all times, collision avoidance is enforced to avoid engagement with the geofence, a static obstacle (e.g., a tree) and an airborne obstacle (e.g., another drone or other aircraft). For example, if another drone on an autonomous mission appears within the geofence, autopilot may be invoked to position the drone in a safe location. Similarly, if a foreign aircraft (e.g., a plane) enters the geofence, autopilot may be invoked to position the drone in a safe location. The safe location may be a safe airborne position (latitude, longitude, altitude) or a land site. Autopilot may also be invoked in the event that wind blows the drone out of the geofence, in such a case, the autopilot returns the drone to the geofence. In the case where the takeoff location is outside of the geofence, autopilot waypoint directions transition the drone from the geofence to the takeoff location. The drone control application may also include a mode that allows a user of the drone control machine 170 to override autopilot and user commands. The user of the drone control machine 170 is in the presence of the drone 192 and therefore may have a unique understanding of a potential dangerous situation.

In one embodiment, collision avoidance is based on relative positioning between two drones, and velocity input manipulation to the drone performing the avoidance maneuvers. Consider the following situation. Drone A 700 is shown as 700 in FIG. 7. The drone is a teleoperated drone performing the avoidance maneuvers. Its position (latitude, longitude, altitude), current drone velocity (north, east, down), and input velocity to the drone (north, east, down) are known. Drone B 702 is a target drone to be avoided. Its position (latitude, longitude, altitude) are known. At a high level, the strategy is to map the teleoperators input (e.g. in the form of key presses) to an input velocity to drone A. If drone A is close to drone B and the attempted input velocity would bring drone A closer to drone B, redirect the input velocity to be away from drone B before sending the command to the drone. The amount to redirect the input velocity vector away from the target drone is a function of the three-dimensional distance between the two drones.

Figure 7:
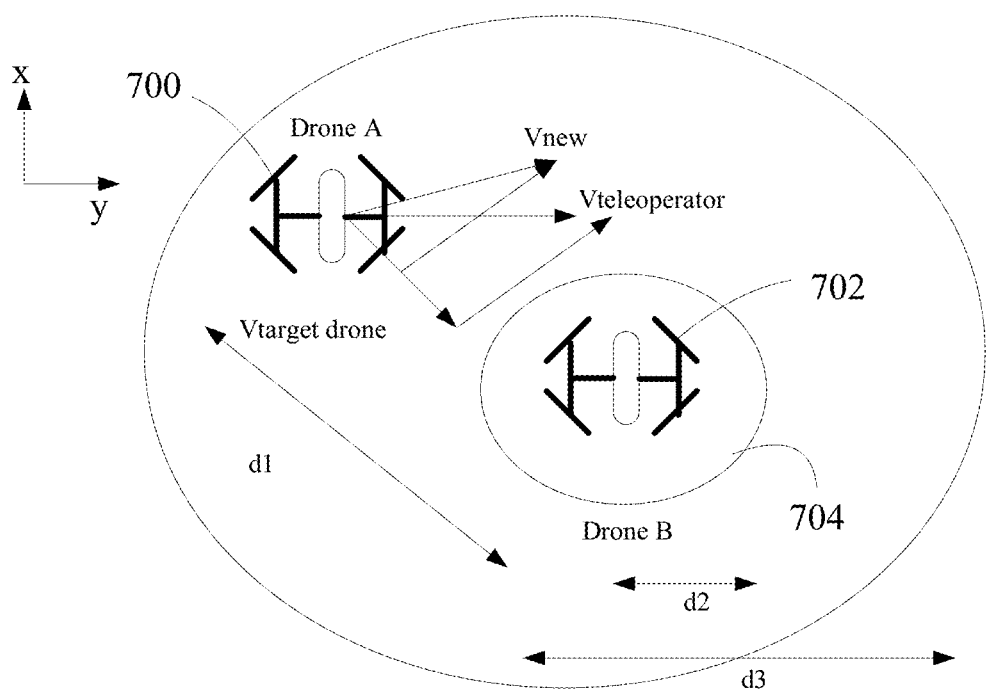
FIG. 7 illustrates airborne obstacle avoidance in accordance with an embodiment of the invention.

With this approach, each drone effectively forms a virtual safety sphere around itself. FIG. 7 illustrates such a sphere 704 for drone 702. If another drone attempts to fly into this drone, it will be rebounded away. Once the other drone enters the outer sphere, this rebounding effect begins. At the start of the inner sphere, any input velocity to drone A which would move it closer to drone B is not permitted.

Onboard sensing allows one to gather drone A's position and velocity. In order to receive drone B's position, each drone broadcasts its position via a socket (e.g., a User Datagram Protocol socket) and each other drone in the area listens to these position updates. More particularly, onboard sensor signals from drone 192 are relayed to the drone control console 190, which directs the signals to the drone control application 182 of drone control machine 170. The drone control machine 170 communicates with other drone control machines operating other drones in the area.

FIG. 7 shows a snapshot of the collision avoidance being performed. The teleoperator of drone A has attempted to issue a velocity input to the drone ($V_{teleoperator}$), which would cause the drone to move towards drone B. Since the two drones are a distance d1 from each other, and d1 is between the inner avoidance threshold d2 and an outer avoidance threshold d3, the input velocity is moderately redirected away from drone B. To do this, drone A's input velocity is decomposed into vector components. The velocity component which is in the direction of drone B ($V_{target\_drone}$) is then reduced. The amount this component is reduced is proportional to the Euclidean distance between the two drones. This value is scaled between the inner and outer thresholds (d2 and d3), i.e. if the drone A is a distance d2 away from the target drone, then reduce the velocity towards the target drone to zero. The input velocity component orthogonal to $V_{target\_drone}$ is preserved. The reduced component and the orthogonal component are combined to form the new input velocity vector which is issued to the drone ($V_{new}$). FIG. 7 is shown in the two dimensional plane for simplicity; in reality the same logic is used for the three-dimensional case.

Returning to FIG. 2, the operation in block 210 may be omitted. That is, the disclosed system may be used to deploy autopilot drone sessions in which the video is streamed via peer-to-peer connections from a drone control machine 170 to one or more user machines 102.

The operations of FIG. 2 may also be implemented for multiple users. In one embodiment, every user is given control over the entire set of drone controls. As multiple users press different commands throughout a session, the drone control application 180 averages the signals into a set of final commands. For example, if three users attempt to move the drone to the right and one user attempts to move the drone forward, the drone moves to the right and slightly forward. Alternately, each user is given sole ownership over a specific drone control. For example, one user is enabled to move the drone forward and backward. Another user is enabled to move the drone left and right. Alternately, each user is given sole or shared ownership of different drone controls at different times throughout a session.

Figure 8:
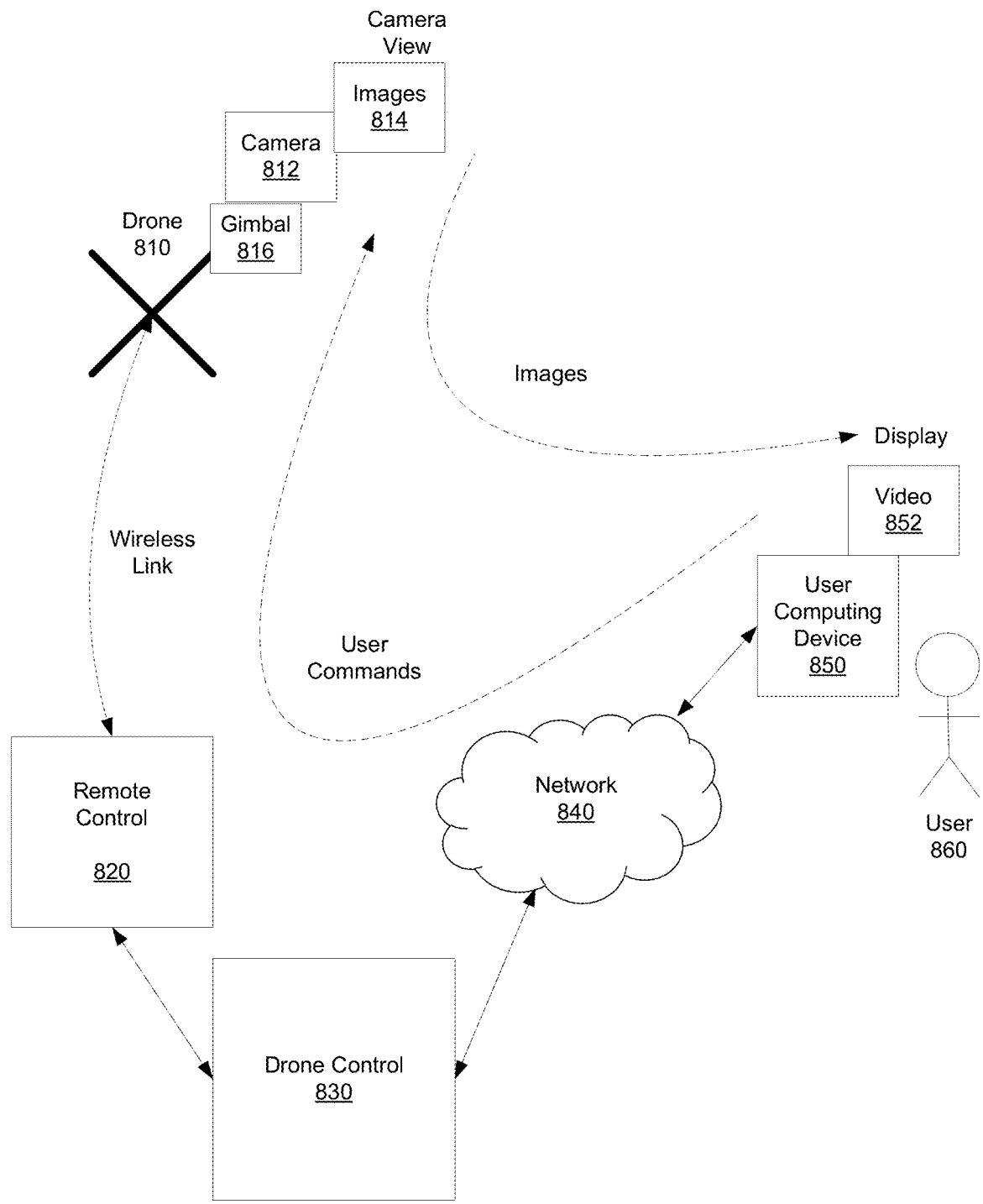
FIG. 8 shows a system for controlling a drone based on commands provided by the tele-operator, and based on based on virtual flight assistance constraints, according to an embodiment.

FIG. 8 shows a system for controlling a drone 810 based on commands provided by the tele-operator 860, and based on based on virtual flight assistance constraints, according to an embodiment. As shown, the system includes a drone user machine (user computing device) 850, a drone control machine (drone control) 830, and a drone control console (remote control) 820. The drone user machine 850 includes a display 852 which displays video generated by a camera 812 (the camera takes images 814) located on the drone 810, and the drone control user machine 850 operates to receive user commands from the user (also referred to as the tele-operator) 860. For an embodiment, the drone 810 includes a gimbal 816.

For at least some embodiments, the drone control machine 830 is interfaced with the drone user machine 850 through a network 840. For an embodiment, the network includes an internet network. Further, for at least some embodiments, the drone control machine 830 is interfaced with the drone 810 through the drone control console 820.

For at least some embodiments, the drone control machine 830 operates to receive user commands from the drone user machine 850 through the network 840, generate drone control commands which are provided to the drone control console 820 for controlling the drone 810, wherein the drone control commands are generated based on the user commands.

For at least some embodiments, the drone control machine 830 further operates to receive video from the drone control console that was generated by a camera located on the drone, and communicate the video to the drone user machine over the network, wherein the video is displayed on a display associated with the drone user machine.

Internet Connection Between Drone and Tele-Operator

For an embodiment, the controller (such as, a drone controller 830) facilitates an internet connection between the computing device 850 of the tele-operator and the drone 810. For an embodiment, the drone control includes the functionality of the previously described drone control machine 170, the user computing device 850 includes the functionality of the drone user machine 102, and the remote control 820 includes the functionality of the drone control console 190.

For at least some embodiments, the drone control machine 830 further operates to receive user commands from the drone user machine through the network, and generate drone control commands which are provided to the drone control console for controlling the drone, wherein the drone control commands are generated based on the user commands, and based on virtual flight assistance constraints. For at least some embodiments, the virtual flight assistance constraints include one or more of a three-dimensional geographical fence, three-dimensional objects (for an embodiment, the objects are three-dimensional), and/or other drones. For an embodiment, the geographical fence constrains horizontal positioning of the drone analogous to keeping the drone within walls or a circle. For an embodiment, the virtual flight assistance constraints include minimum and/or maximum altitude vertical position constraints of the drone. For an embodiment, the virtual flight assistance constraints include obstacles that define areas of space that the drone is to avoid. The geographical fence of the virtual flight assistance constraints include constraints to keep the drone confined within a safe space, and obstacles of the virtual flight assistance constraints are declarations of where objects or other items in space are located in space in which drone fight is not allowed.

Virtual Flight Constraints

For at least some embodiment, the controller (such as, a drone controller 830) receives commands from the tele-operator that at least partially controls the three-dimensional location of the drone 810. For an embodiment, the drone controller 830 restricts the three-dimensional location of the drone 810 based on determined three-dimensional geo-fencing restrictions, as determined by the virtual flight assistance constraints. That is, pre-determined geo-fencing restrictions limit where the drone 810 can be located. If the drone controller 830 receives instructions or commands that attempt to take the drone 810 outside of the geo-fencing restrictions, the drone controller 830 limits these command or instructions to prohibit the drone 810 from going to these locations.

Figure 9:
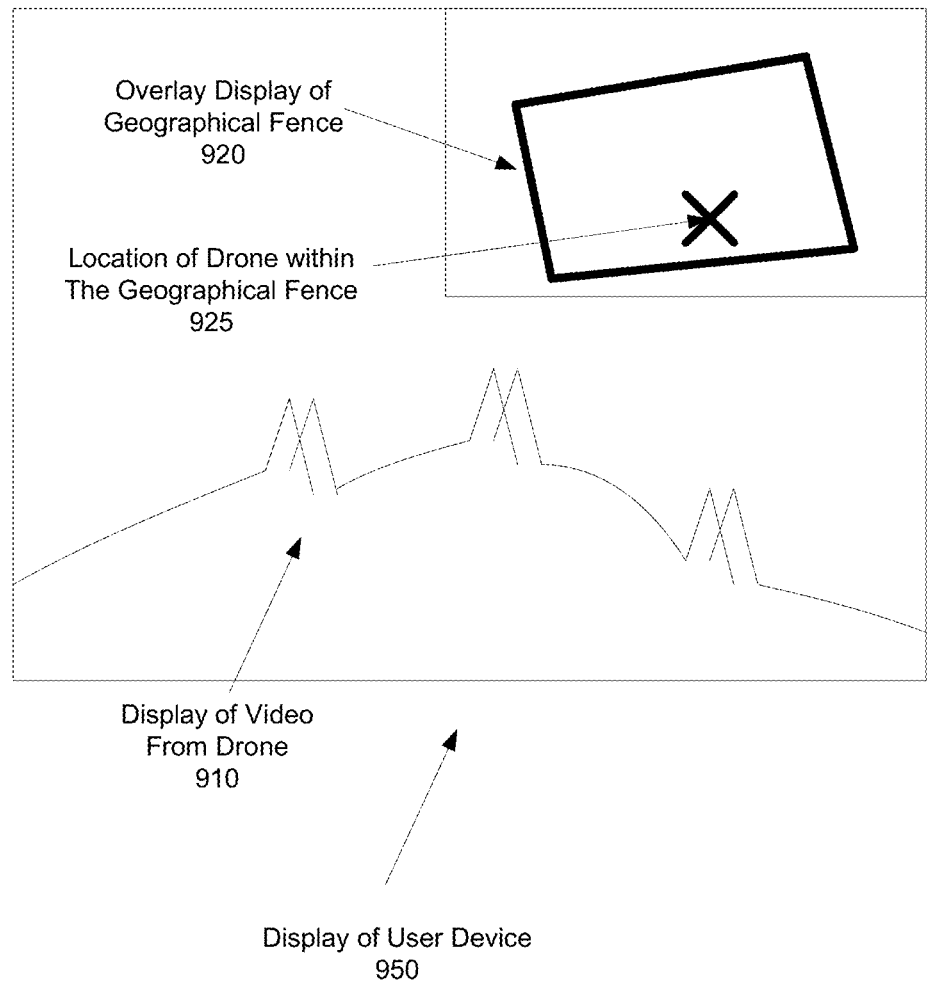
FIG. 9 shows a display of a user computing device that displays video provided by a drone, and further displays an overlay that includes a depiction of virtual flight assistance constraints and a location of the drone relative to the virtual flight assistance constraints, according to an embodiment.

FIG. 9 shows a display 950 of a user computing device that displays video 910 provided by a drone, and further displays an overlay that includes a depiction of virtual flight assistance constraints 920 and a location of the drone 925 relative to the virtual flight assistance constraints 920, according to an embodiment. As previously described, for an embodiment, the virtual flight assistance constraints 920 include a geographical fence. However, the virtual flight assistance constraints 920 can additionally or alternatively include obstacles and/or other drones.

As shown in FIG. 9, the virtual flight assistance constraints include a geographical fence, and the overlay 920 further shows the position or location of the drone relative to the geographical fence. As previously described, video generated by the camera of the drone that is being controlled by the tele-operator is displayed to the tele-operator. Further, for an embodiment, the drone controller generates virtual flight assistance constraints information which is displayed to the tele-operator on the display of the computing device 850 of the tele-operator. The overlay of the geographical fence 920 and the overlay of the location/position 925 of the drone relative to the geographical fence 920 aid the tele-operator in controlling the drone. That is, the drone controller generates and provides the virtual flight assistance constraints information which not only is used to control the operation of the drone, but the virtual flight assistance constraints information is also provided to the computing device of the tele-operator so that the virtual flight assistance constraints information can be conveyed to the tele-operator in the form of an overlay to the video of the drone being displayed to the tele-operator. Other forms of depicting the virtual flight assistance constraints and the relation of the drone relative to the virtual flight assistance constraints can be utilized. However, the overlaying the virtual flight assistance constraints and the relation of the drone relative to the virtual flight assistance constraints over the display of the video of the drone is a very powerful tool for the tele-operator to use to control the operation of the drone.

Figure 10:
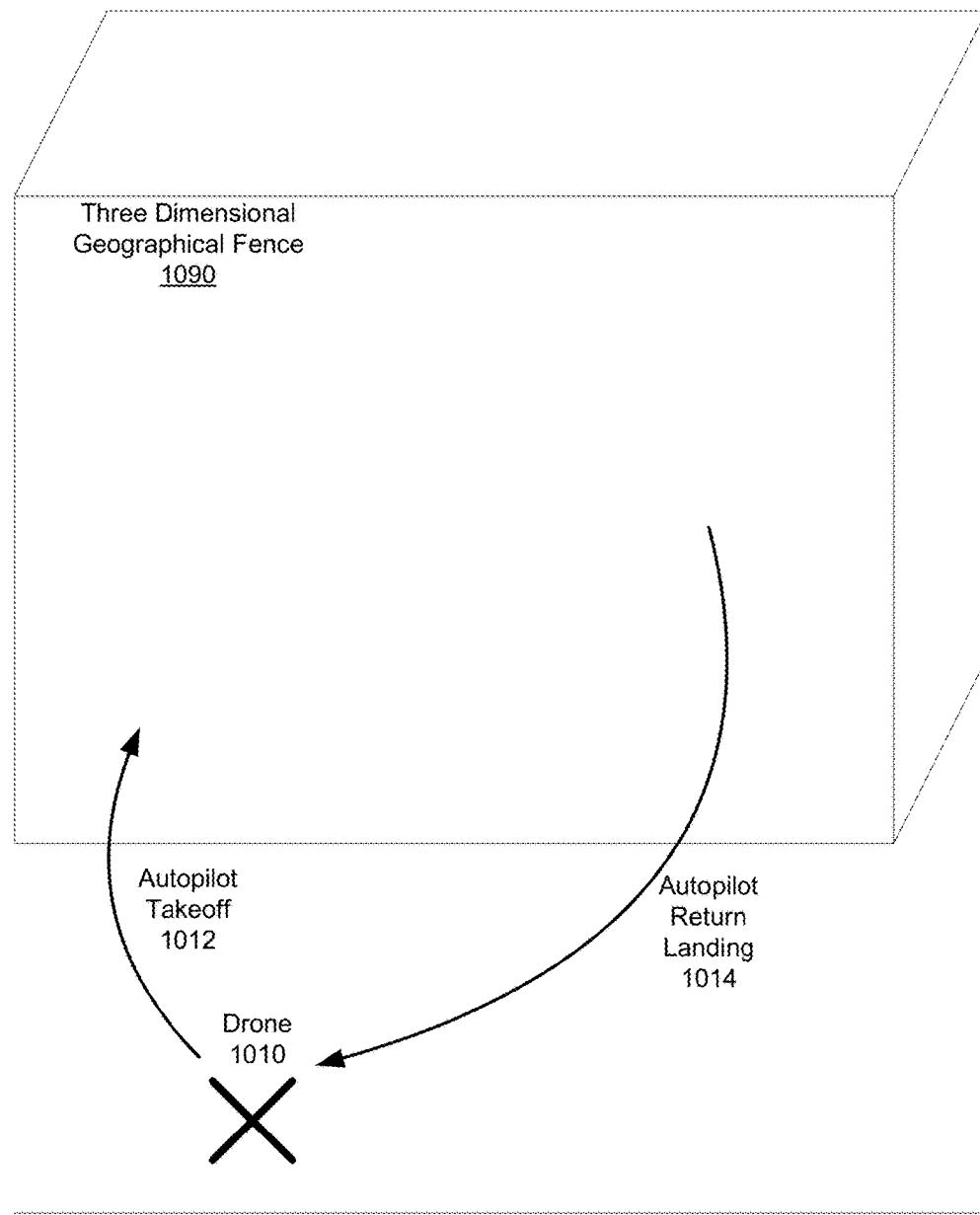
FIG. 10 shows a depiction of a three-dimensional geographical fence, and further depicts an autopilot controlled takeoff and return landing of a drone, according to an embodiment.

FIG. 10 shows a depiction of a three-dimensional geographical fence 1090, and further depicts an autopilot controlled takeoff 1012 and return landing 1014 of a drone 1010, according to an embodiment. As previously described, for an embodiment, the drone control 830 operates to liftoff the drone and navigates the drone 1010 to be within the virtual flight assistance constraints. In some situations, the drone initially starts outside of the three-dimensional geofence and needs to by directed or guided into the not-restricted areas as defined by the virtual flight assistance constraints.

For an embodiment, the drone control commands include autopilot commands (that is, not user generated) that direct lift off of the drone and direct the drone into the three-dimensional geographical fence. Further, for an embodiment, the drone control commands include autopilot commands to direct the drone from a current location while in flight within the three-dimensional geographical fence back to an original takeoff point. That is, after being directed to be within the virtual flight assistance constraints the drone is later controlled to leave the virtual flight assistance constraints and return to, for example, the original takeoff point. It is to be understood that the drone can be directed to any desired or selected landing point. Again, for an embodiment, the drone control 830 generates the drone control commands for automatically directing the drone to the original take of point of other selected landing point. For at least some embodiments, the flight assistance constraints apply during autopilot missions as well. That is, not only can the flight assistance constraints applied to user commands, the flight assistance constraints can additionally be applied to autopilot missions, autopilot paths, and to the calculations of autopilot paths.

While the drone is in operation, it is possible for the drone to be pushed outside of the virtual flight assistance constraints (the three-dimensional geographical fence) due to, for example, wind. For an embodiment, the drone control commands include autopilot commands to direct the drone from a current location outside of the three-dimensional geographical fence back to within the three-dimensional geographical fence when the drone uncontrollably exits the three-dimensional geographical fence.

For an embodiment, the virtual flight assistance constraints can include obstacles. Further, as described, for an embodiment, the drone control commands are generated based on the user commands, and based on directing the drone away from the obstacles.

At least some embodiments include a "virtual representation of the obstacle" which may come from 3D data of that obstacle from a point cloud, or other data sources. For at least some embodiments, obstacles are, like geofences, a 2D constraint on the horizontal position of the drone (that is, the drone cannot move horizontally within the obstacle), and a constraint on height (while over the obstacle, the drone cannot go below the maximum height of the obstacle, and while under the obstacle, while a rare case, the drone cannot go above the minimum height of the obstacle). For at least some embodiments, an obstacle is, similar to a geofence, 2D walls or a circle, having a minimum and maximum altitude. For an embodiment, one or more of the obstacles are motionless. For an embodiment, one or more of the obstacles are in motion. For at least some embodiments, virtual flight assistance constraints are constructed using tools such as a point cloud, LIDAR (light imaging detection and ranging), or other mapping tools.

For at least some embodiments, the virtual flight assistance constraints include terrain data. For at least some embodiments, the terrain data includes information related to the physical terrain around (usually below) the drone while in operation. The terrain can include shapes of the ground, valleys, hills, mountains, trees, etc. For an embodiment, the terrain data includes a digital elevation map (DEM), which includes elevations for constraining the minimum altitude of the drone.

Figure 11:
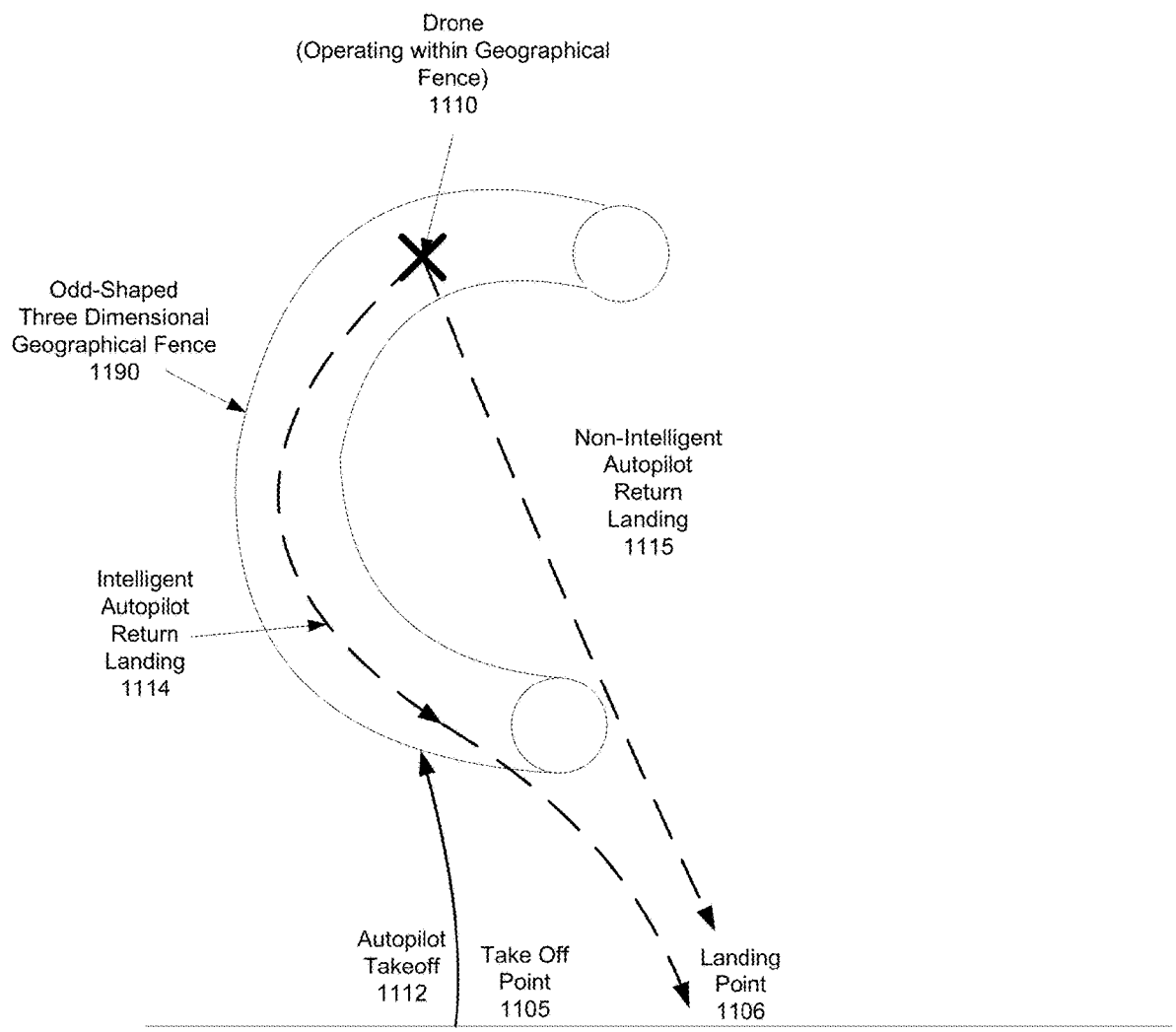
FIG. 11 shows a depiction of a three-dimensional geographical fence, and further depicts an autopilot controlled takeoff and return landing of a drone, according to an embodiment.

FIG. 11 shows a depiction of a three-dimensional geographical fence 1190, and further depicts an autopilot controlled takeoff 1112 and return landing of a drone 1110, according to an embodiment. In some situations, the three-dimensional geographical fence 1190 may have a shape and the drone 1110 may be located within the three-dimensional geographical fence 1190 such that a directing the drone 1110 on a straight line between the location of the drone 1110 within the three-dimensional geographical fence 1190 to the desired landing location 1106 requires the drone 1110 to violate the three-dimensional geographical fence 1190 more than a strategically selected non-straight line.

As shown in FIG. 11, a non-intelligent autopilot return landing 1115 may follow a straight line or near straight line return to a landing point 1106 of the drone 1110 operating within the three-dimensional geographical fence 1190. However, such a non-intelligent autopilot return landing 1115 of the drone may introduce a large than needed time of the flight of the drone 1110 outside of the three-dimensional geographical fence 1190.

At least some embodiments include intelligent path planning (the path including the autopilot controlled take off and/or return landing of the drone) to ensure the drone does not exit the geographical fence 1190 during autopilot missions, such as returning home. If the takeoff point 1105 is outside the geographical fence 1190, the determined controlled return landing picks the closest point (or a near-closest point) of the geographical fence 1190 to the takeoff point 1105 (or the landing point 1106) for the drone 1110 to exit the geographical fence 1190, and then directs the drone 1110 to fly from the exit point to the takeoff location (at a specified altitude). For at least some embodiments, the drone controller 830 provides the autopilot flight control to the drone based on the intelligent path planning (such as, path 1114). For an embodiment, the intelligent path planning additionally or alternatively includes selecting the location in which the drone exits the geographical fence 1190 so as to minimize the flight distance of the drone outside the geographical fence 1190.

For at least some embodiments, the intelligent path planning additionally or alternatively includes a $3^{rd}$ altitude that can be referred to as "altitude to fly while outside geographical fence 1190". For at least some embodiments, this is the altitude the autopilot control uses while entering or exiting the geographical fence 1190.

Figure 12:
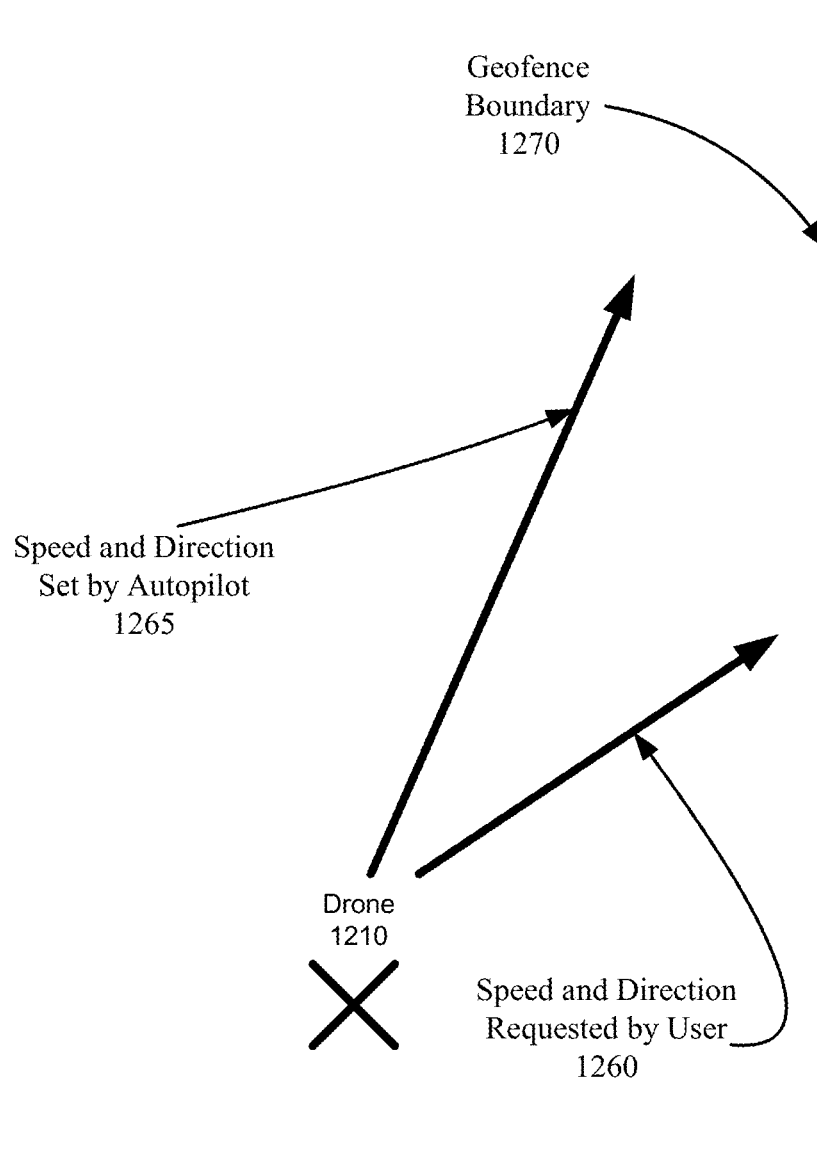
FIG. 12 shows a drone and depicts an adjustment to a user requested speed and direction due to one or more virtual flight assistance constraints, according to an embodiment.

FIG. 12 shows a drone 1210 and depicts an adjustment to a user requested speed and direction due to one or more virtual flight assistance constraints, according to an embodiment. An embodiment includes controlling a velocity of the drone 1210 based on the user commands, and based on conditions of the virtual flight assistance constraints. As described, for an embodiment, the drone control machine generates drone control commands which are provided to the drone control console for controlling the drone, wherein the drone control commands are generated based on the user commands, and based on virtual flight assistance constraints.

As shown, a user may request a speed and direction 1260 that would direct the drone 1210 into a virtual flight assistance constraint, such as, a geofence boundary 1270. For at least some embodiments, sensors of the drone (telemetry) provide sensed altitude, velocity, and/or acceleration of the drone. For an embodiment, the sensed telemetry information is periodically obtained from the drone. For an embodiment, the sensed telemetry information, a desired velocity and direction (as determined from the user commands), and the virtual flight assistance constraints are used to determine a constrained velocity and direction. The constrained velocity and direction are conveyed to the drone by drone control commands through the drone control 830. The drone control commands generated by the drone controller based on the virtual flight assistance constraints modify the speed and direction 1265. The drone control 830 modifies the speed and direction of the drone based on the flight assistant constraints.

For at least some embodiments, the constrained velocity and direction of the drone are determined in order to avoid collisions. As previously stated, the sensed telemetry information, a desired velocity and direction (as determined from the user commands), and the virtual flight assistance constraints are used to determine a constrained velocity and direction. The constrained velocity and direction are conveyed to the drone by drone control commands through the drone control 830. That is, the drone control commands are generated by modifying the user inputs in order to avoid any collision with the geographical fence, marked obstacles, or other drones. The drone control commands can be further controlled to avoid other aircrafts flying towards the drone.

For at least some embodiments, determination of the constrained velocity and direction includes determining objects to avoid, such as, the closest points of the geographical fence, obstacles or other flying objects (such as, other drones). For an embodiment, the determination of the constrained velocity and direction further includes enforcing collision avoidance logic on the N (for example, two) closest objects to the drone if the N closest objects are closer than a threshold distance. For an embodiment, the threshold distance is adaptively selected based on the current speed of the drone. For an embodiment, the collision avoidance logic operates to reduce the desired velocity of the drone towards the N closest objects. The reduction in the velocity of the drone is based on several factors, such as, a distance between the drone and the object, the current speed of the drone, and the orientation of the drone.

To avoid other objects flying towards the drone, a current course of the other flying objects is determined. If the minimum distance between the drone and the other flying objects is below a predetermined threshold, the user input (desire velocity) is overridden, and the drone is controlled to fly away from a course of the other flying objects. Further, if multiple flying objects are flying toward the drone, the direction of the drone is controlled to maximize (or ensure a threshold distance) from the course of the other multiple flying objects within a minimum (or a threshold amount) of time.

At least some embodiments further include selecting a safe path for the drone which includes determining and setting the drone control commands to determine a safe path between a present location of the drone and a target location. For an embodiment, determining the safe path between the present location of the drone and the target location includes creating a grid which include grid cells, and testing each grid cell utilizing a heuristic. For an embodiment, a safe path is determined as within the geographical fence and avoiding obstacles.

If the present location of the drone or the target location are outside of the geographical fence, then the selection of the safe path includes determining a first portion of the path within the geographical fence which begins or ends at the closest (or near closest) point of the geographical fence to the target location, and determining a second portion of the path outside the geographical fence which avoids obstacles.

For an embodiment, when the drone is operating in an autopilot mode (user commands are not influencing the velocity or direction of the drone) the collision avoidance logic is enforced by modifying a current path of the drone to avoid other flying objects that could be presently within the predetermined path of the drone.

Figure 13:
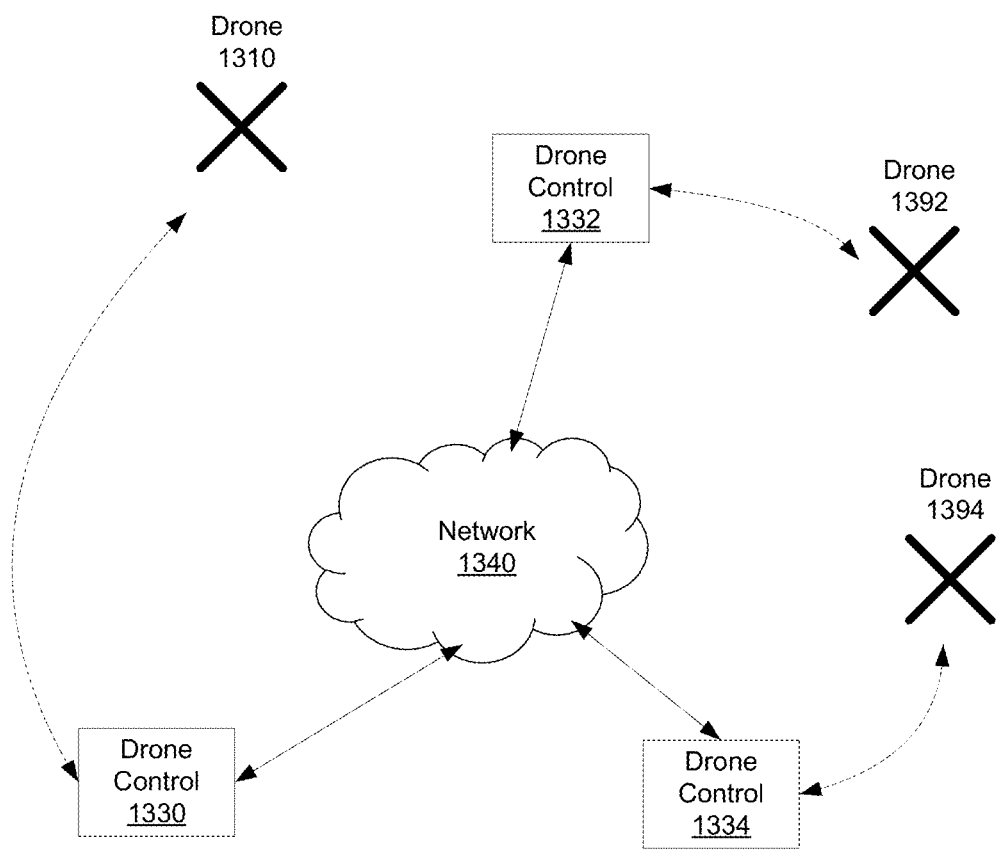
FIG. 13 shows a plurality of drones and a plurality of drone controllers, wherein the drone controllers share drone location information, according to an embodiment.

FIG. 13 shows a plurality of drones 1310, 1392, 1394 and a plurality of drone controllers 1330, 1332, 1334, wherein the drone controllers 1330, 1332, 1334 share drone location information. For an embodiment, the drone control machine 1330 of the drone 1310 communicates with drone control machines 1332, 1334 of other drones 1392, 1394, wherein the communication includes at least current positions of the drone 1310 and the other drones 1392, 1394. For an embodiment, the drone control machine 1330 uses the current positions of the drone 1310 and the other drones 1392, 1394 to aid in the generation of the drone control commands which are provided to the drone control console for controlling the drone. That is, the drone control commands are generated to avoid the drones 1310, 1392, 1394 from crashing into each other. For an embodiment, the drone controllers 1330, 1332, 1334 are connected to each other through a network 1340.

For an embodiment, the virtual flight assistance constraints include the at least current positions of the other drones, and wherein the drone control commands are generated based on the user commands, and based on the at least current positions of the other drones to direct the drone away from the other drones. For an embodiment, the virtual flight assistance constraints are based at least in part on maintaining at least a minimum distance between the drone and the other drones. For an embodiment, the minimum distance includes separate minimum horizontal distance and a minimum vertical distance that is to be maintained between the drone and the other drones. Again, for an embodiment, the minimum distances are maintained by the virtual flight assistance constraints. For an embodiment, a velocity of the drone is constrained based on the at least current positions of the other drones to avoid collisions between the drone and the other drones.

For at least some embodiments, other drones, obstacles and geographical fences are all virtual flight assistance constraints and are processed similarly by the drone control in generation of the drone control commands which are generated based on the user commands, and based on virtual flight assistance constraints. The generation of the drone control commands treats the virtual flight assistance constraints as areas the drone is allowed to fly and areas the drone is not allowed to fly. For an embodiment, other drones are treated as dynamic obstacles which include changing positions. An embodiment includes determining or generating the virtual flight assistance constraints are a frequency that allows for safe flight of the drone. For an embodiment, the rate at which the positioning of other drones changes determines the frequency in which the virtual flight assistance constraints are determined.

FIG. 14 is a flow chart that includes steps of a method of remote location control of flight of a drone, according to an embodiment. A first step 1410 includes interfacing, through a network, a drone user machine with a drone control machine. A second step 1420 includes interfacing, through a drone control console, the drone control machine with the drone. A third step 1430 includes receiving, by the drone control machine, user commands from the drone user machine through the network. A fourth step 1440 includes generating, by the drone control machine, drone control commands which are provided to the drone control console for controlling the drone, wherein the drone control commands are generated based on the user commands, and based on virtual flight assistance constraints.

As previously described, an embodiment includes receiving, by the drone control machine, video from the drone control console that was generated by a camera located on the drone. Further, the drone control machine communicates the video to the drone user machine over the network, wherein the video is displayed on a display associated with the drone user machine, and generates a map view with representations of the virtual flight assistance constraints, wherein the map view overlays a visual representation of the virtual flight assistance constraints over the video displayed on the display.

As previously described, for an embodiment the virtual flight assistance constraints includes a geographical fence that defines a three-dimensional space in which the drone is allowed to fly. For an embodiment, the three-dimensional space in which the drone is allowed to fly includes a minimum and a maximum altitude, or a tethered radius based on a takeoff point.

As previously described, for an embodiment the drone control commands include autopilot commands that direct lift off of the drone and direct the drone into the three-dimensional geographical fence. For an embodiment, the drone control commands include autopilot commands to direct the drone from a current location while in flight within the three-dimensional geographical fence back to an original takeoff point. For an embodiment, the virtual flight assistance constraints are also applied to the autopilot commands.

As previously described, an embodiment includes controlling a velocity of the drone based on the user commands, and based on constraints of the virtual flight assistance constraints.

As previously described, for an embodiment the drone control commands include autopilot commands to direct the drone from a current location outside of the three-dimensional geographical fence back to within the three-dimensional geographical fence when the drone uncontrollably exits the three-dimensional geographical fence.

As previously described, for an embodiment the virtual flight assistance constraints include obstacles, and wherein the drone control commands are generated based on the user commands, and based on directing the drone away from the obstacles. For an embodiment, the virtual flight assistance constraints include terrain data.

As previously described, for an embodiment the drone control machine of the drone communicates with drone control machines of other drones, wherein the communication includes at least current positions of the drone and the other drones. For an embodiment, the virtual flight assistance constraints include the at least current positions of the other drones, and wherein the drone control commands are generated based on the user commands, and based on the at least current positions of the other drones to direct the drone away from the other drones. For an embodiment, a velocity of the drone is constrained based on the at least current positions of the other drones to avoid collisions between the drone and the other drones.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of remote location control of flight of a drone, comprising:
   interfacing, through a network, a drone user machine with a drone control machine;
   interfacing, through a drone control console, the drone control machine with the drone;
   receiving, by the drone control machine, video from the drone control console that was generated by a camera located on the drone;
   communicating, by the drone control machine, the video to the drone user machine over the network, wherein the video is displayed on a display associated with the drone user machine;
   generating a virtual flight assistance constraint overlay with representations of the virtual flight assistance constraints relative to a location of the drone, wherein the virtual flight assistance constraint overlay overlays the video displayed on the display by the drone user machine;
   receiving, by the drone control machine, user commands from the drone user machine through the network; and
   generating, by the drone control machine, drone control commands which are provided to the drone control console for controlling the drone, wherein the drone control commands are generated based on the user commands, and based on virtual flight assistance constraints.

2. The method of claim 1, wherein the virtual flight assistance constraints includes a geographical fence that defines a three-dimensional space in which the drone is allowed to fly.

3. The method of claim 2, wherein the three-dimensional space in which the drone is allowed to fly includes a minimum and a maximum altitude, or a tethered radius based on a takeoff point.

4. The method of claim 1, wherein the drone control commands include autopilot commands that direct lift off of the drone and direct the drone into the three-dimensional geographical fence.

5. The method of claim 4, wherein the drone control commands include autopilot commands to direct the drone from a current location while in flight within the three-dimensional geographical fence back to an original takeoff point.

6. The method of claim 1, further comprising controlling a velocity of the drone based on the user commands, and based on constraints of the virtual flight assistance constraints.

7. The method of claim 1, wherein the drone control commands include autopilot commands to direct the drone from a current location outside of the three-dimensional geographical fence back to within the three-dimensional geographical fence when the drone uncontrollably exits the three-dimensional geographical fence.

8. The method of claim 1, wherein the virtual flight assistance constraints include obstacles, and wherein the drone control commands are generated based on the user commands, and based on directing the drone away from the obstacles.

9. The method of claim 1, wherein the virtual flight assistance constraints include terrain data.

10. The method of claim 1, wherein the drone control machine of the drone communicates with drone control machines of other drones, wherein the communication includes at least current positions of the drone and the other drones.

11. The method of claim 10, wherein the virtual flight assistance constraints include the at least current positions of the other drones, and wherein the drone control commands are generated based on the user commands, and based on the at least current positions of the other drones to direct the drone away from the other drones.

12. The method of claim 11, wherein a velocity of the drone is constrained based on the at least current positions of the other drones to avoid collisions between the drone and the other drones.

13. A system, comprising:
    a drone user machine;
    a drone control machine, wherein the drone control machine is interfaced with the drone user machine through a network;
    a drone control console, wherein the drone control machine is interfaced with a drone through the drone control console;
    wherein the drone control machine operates to:
    receive video from the drone control console that was generated by a camera located on the drone;
    communicate the video to the drone user machine over the network;
    receive user commands from the drone user machine through the network; and
    generate drone control commands which are provided to the drone control console for controlling the drone, wherein the drone control commands are generated based on the user commands, and based on virtual flight assistance constraints; and
    wherein the drone user machine operates to:
    display the video from the drone user machine accompanying a virtual flight assistance constraint overlay with representations of the virtual flight assistance constraints relative to a location of the drone, wherein the virtual flight assistance constraint overlay overlays the video displayed on the display.

14. The system of claim 13, wherein the virtual flight assistance constraints include a geographical fence that defines a three-dimensional space in which the drone is allowed to fly, wherein the three-dimensional space in which the drone is allowed to fly includes a minimum and a maximum altitude, or a tethered radius based on a takeoff point.

15. The system of claim 13, wherein the drone control commands include autopilot commands that direct lift off of the drone and direct the drone into the three-dimensional geographical fence, and wherein the drone control commands include autopilot commands to direct the drone from a current location while in flight within the three-dimensional geographical fence back to an original takeoff point.

16. The system of claim 13, wherein the drone control machine further operates to control a velocity of the drone based on the user commands, and based on constraints of the virtual flight assistance constraints.

17. The system of claim 13, wherein the drone control machine of the drone communicates with drone control machines of other drones, wherein the communication includes at least current positions of the drone and the other drones, wherein the virtual flight assistance constraints include the at least current positions of the other drones, and wherein the drone control commands are generated based on the user commands, and based on the at least current positions of the other drones to direct the drone away from the other drones, wherein a velocity of the drone is constrained based on the at least current positions of the other drones to avoid collisions between the drone and the other drones.

* * * * *